US011738322B1

(12) United States Patent
Ghiassi et al.

(10) Patent No.: US 11,738,322 B1
(45) Date of Patent: Aug. 29, 2023

(54) MICROFLUIDIC FLOW PROCESS FOR MAKING LINEAR POLYMERS

(71) Applicant: Government of the United States, as represented by the Secretary of the Air Force, Wright-Patterson AFB, OH (US)

(72) Inventors: Kamran B. Ghiassi, Palmdale, CA (US); Neil D. Redeker, Lancaster, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 304 days.

(21) Appl. No.: 17/218,469

(22) Filed: Mar. 31, 2021

Related U.S. Application Data

(60) Provisional application No. 63/070,899, filed on Aug. 27, 2020.

(51) Int. Cl.
*C08F 2/02* (2006.01)
*B01J 19/00* (2006.01)
*C08F 2/06* (2006.01)

(52) U.S. Cl.
CPC ............ *B01J 19/0093* (2013.01); *C08F 2/02* (2013.01); *C08F 2/06* (2013.01); *B01J 2219/00353* (2013.01); *B01J 2219/00736* (2013.01)

(58) Field of Classification Search
CPC ....... B01J 19/0093; C08F 36/04; C08F 36/06; C08F 36/08; C08F 136/04; C08F 136/06; C08F 136/08; C08F 236/04; C08F 236/06; C08F 236/08; C08F 2/02; C08F 2/06
See application file for complete search history.

(56) References Cited

U.S. PATENT DOCUMENTS

| 3,031,439 | A | 4/1962 | Bailey |
| 3,294,768 | A | 12/1966 | Wofford |
| 3,787,377 | A | 1/1974 | Halasa et al. |
| 3,980,625 | A | 9/1976 | Sakamoto et al. |

(Continued)

FOREIGN PATENT DOCUMENTS

EP  0090445 A2  5/1983

OTHER PUBLICATIONS

Schulze et al. Green Process Synth 2013, 2, 381-395 (Year: 2013).*

(Continued)

*Primary Examiner* — Mark S Kaucher
(74) *Attorney, Agent, or Firm* — AFMCLO/JAZ; James F. McBride

(57) ABSTRACT

The present invention relates to a microfluidic flow process for making polymers, polymers made by such processes, and methods of using such polymers. In such process, a novel reagent delivery setup is used in conjunction with microfluidic reaction technology to synthesize anionic polymerization reaction products from superheated monomer orders of magnitude faster than is possible in batch and continuous syntheses. The aforementioned process does not require the cryogenic temperatures which are required for such syntheses in batch or bulk continuous. Thus the aforementioned process is more economically efficient and reduces the environmental impact of linear polymer production.

15 Claims, 2 Drawing Sheets

(56) References Cited

U.S. PATENT DOCUMENTS

| | | | |
|---|---|---|---|
| 4,859,750 A | 8/1989 | Kato et al. | |
| 2002/0128416 A1* | 9/2002 | Marcarian | B01F 25/23 |
| | | | 526/318.4 |
| 2014/0080115 A1* | 3/2014 | Reed | B01D 35/1475 |
| | | | 210/132 |
| 2016/0368847 A1* | 12/2016 | Furuta | C08G 65/2696 |

OTHER PUBLICATIONS

Gregor Wille Sigma Aldrich CPAC Satellite Meeting on Mar. 23, 2010 (Year: 2010).*
Furuta et al. Bull. Chem. Soc. Jpn. 2017, 90, 838-842 (Year: 2017).*
Forens, A.; Roos, K.; Dire, C.; Gadenne, B.; Carlotti, S.; Accessible microstructures of polybutadiene by anionic polymerization, Polymer 153 (2018) 103-122.
Jana Herzberger, J.; Niederer, K.; Pohlit, H.; Seiwert, J.; Worm, M.; Wurm, F. R.; Frey, H.; Polymerization of Ethylene Oxide, Propylene Oxide, and Other Alkylene Oxides: Synthesis, Novel Polymer Architectures, and Bioconjugation, Chem. Rev. 2016, 116, 2170-2243.
Takahashi, Y.; Nagaki, A.;Review Anionic Polymerization Using Flow Microreactors, Molecules 2019, 24, 1532, 1-19.
Tonhauser, C.; Natalello, A.; Holger Lowe, H.; Frey, H.;Microflow Technology in Polymer Synthesis, Macromolecules 2012, 45, 9551-9570.

\* cited by examiner

MICROFLUIDIC FLOW PROCESS FOR MAKING LINEAR POLYMERS

CROSS-REFERENCE TO RELATED APPLICATION

The present application claims priority to U.S. Provisional Application Ser. No. 63/070,899 filed Aug. 27, 2020, the contents of which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to a microfluidic flow process for making linear polymers, linear polymers made by such processes, and methods of using such linear polymers.

BACKGROUND OF THE INVENTION

Anionic polymerization methods are commonly used to produce elastomers from conjugated diene monomers on small scales, affording excellent control over product microstructure and chain end functionality. Furthermore, anionic polymerization has been performed using microreactors, which address many of the difficulties associated with conventional anionic polymerization. However, the low reactivities of these monomers in the preferred reaction media, as well as the low boiling point of neat monomer and high vapor pressure of the monomer in solution, make it very difficult to continuously achieve the controlled reagent delivery required for microfluidic synthesis using such low-boiling conjugated dienes.

Applicants recognized that the inefficiencies associated with the aforementioned production processes arise from the lack of precise temperature control and uniformity in the reaction mixture, the difficulty in keeping the reaction vessel sufficiently dry so as to prevent chain end degradation, and the difficulty of introducing superheated reagent into the reactor in a continuous matter. Furthermore, Applicants recognized that imprecise control over reagent introduction results in a reduction in final product performance. Thus, Applicants realized that a new synthetic method allows for the continuous and controlled delivery of a superheated liquid into a microfluidic reactor would be advantageous to the manufacturing of elastomers from conjugated dienes.

Applicants discovered that such controlled continuous microfluidic polymerization could be achieved by conducting anionic polymerization in a microfluidic flow regime using continuous flow piston pumps to propel a pumping fluid which in turn propels superheated monomer or monomer solution into the reactor. While not being bound by theory, Applicants believe that employing such a setup addresses the aforementioned processing challenges by allowing for the controlled, sustained introduction of superheated reagent into the microfluidic reactor. This allows access to the efficient mixing and excellent heat transfer inherent in microfluidic reactors which is not possible in conventional processes. Such improvements mixing efficiency and heat transfer can be leveraged to utilize short residence times and improved product property consistency, and improved process scalability.

SUMMARY OF THE INVENTION

The present invention relates to a microfluidic flow process for making polymers, polymers made by such processes, and methods of using such polymers. In such process, microfluidic reaction technology is used to polymerize superheated monomer, neat or in solution, orders of magnitude faster than is possible in batch and continuous syntheses. The aforementioned process does not require cooling of the monomer reservoir below the boiling point of said monomer. Thus the aforementioned process is more economically efficient and reduces the environmental impact of polymer production, and can produce polymer in greater purity than obtained through typical processes.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1:
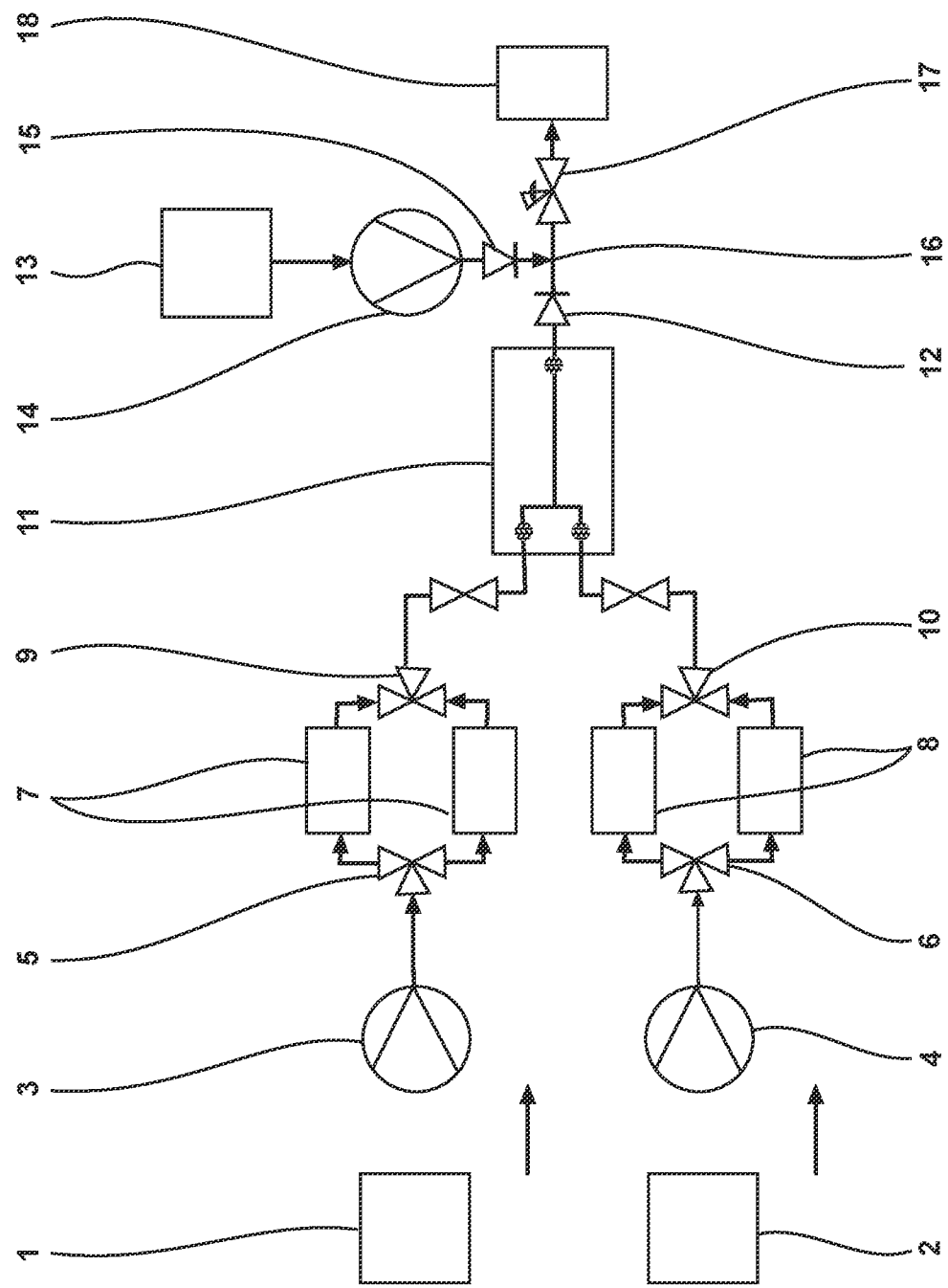
FIG. 1 is a schematic displaying a flow reactor system that employs a chip style reactor design with a continuous flow pump driving superheated reagent delivery.

Unless specifically stated otherwise, as used herein, the terms "a", "an" and "the" mean "at least one".

As used herein, the terms "include", "includes" and "including" are meant to be non-limiting.

As used herein, superheated fluid means a liquid whose temperature is above the boiling point of such liquid at one atmosphere of pressure.

Unless otherwise noted, all component or composition levels are in reference to the active portion of that component or composition, and are exclusive of impurities, for example, residual solvents or by-products, which may be present in commercially available sources of such components or compositions.

The words "about," "approximately," or the like, when accompanying a numerical value, are to be construed as indicating a deviation as would be appreciated by one of ordinary skill in the art to operate satisfactorily for an intended purpose.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Processes of Making Linear Polymers

For purposes of this specification, headings are not considered paragraphs and thus this paragraph is Paragraph 0019 of the present specification. The individual number of each paragraph above and below this paragraph can be determined by reference to this paragraph's number. In this paragraph 0019, Applicants disclose a process of making a linear polymer said process comprising:

a) introducing a superheated fluid comprising a material selected from the group consisting of conjugated dienes, ethylene oxide and mixtures thereof, preferably said fluid comprises conjugated dienes and/or ethylene oxide; at a controlled rate, said rate having a variability of no greater than 1% of said superheated fluid's introduction rate into a microfluidic reactor; said superheated fluid being introduced by continuous piston pumps that propel a pumping fluid which in turn propels the superheated fluid into said microfluidic reactor. This pumping fluid may be any fluid which is not reactive with the superheated fluid, such as hexanes.

b) introducing an initiator at a controlled rate, said rate having a variability of no greater than 1% of said initiators introduction rate into said microfluidic reactor; and c) reacting, at one or more temperatures, said superheated fluid and initiator to form a linear polymer, said one or more temperatures being controlled such that each temperature has a variability of about plus or minus 10 degrees, preferably said one or more temperatures being controlled such that each temperature has a variability of about plus or minus five degrees, more preferably said one or more temperatures being controlled such that each temperature has a variability of about plus or minus 1 degree;

d) adding a second liquid comprising a protic species to said linear polymer to form a linear polymer protic species solution, preferably said proteic species and said linear polymer are combined in a second microfluidic reactor;

preferably said superheated fluid and said initiator are simultaneously introduced at a temperature of from about 0° C. to about 100° C., said superheated fluid and said initiator having residence time of from about 10 seconds to about 3600 seconds, more preferably said superheated fluid and said initiator are simultaneously introduced at a temperature of from about 0° C. to about 100° C., said superheated fluid and said initiator having residence time of from about 30 seconds to about 1800 seconds, most preferably said superheated fluid and said initiator are simultaneously introduced at a temperature of from about 40° C. to about 80° C., said superheated fluid and said initiator having residence time of from about 60 seconds to about 600 seconds.

Applicants disclose the process according to Paragraph 0019, wherein said conjugated diene is selected from the group consisting of chloroprene, butadiene, isoprene and mixtures thereof, preferably said conjugate diene is selected from the group consisting of isoprene and butadiene and mixtures thereof Applicants disclose the process according to Paragraph 0019, wherein said superheated liquid is obtained by condensing a gas, said gas comprising a material selected from the group consisting of ethylene oxide, butadiene, isoprene and mixtures thereof, preferably said gas comprises a material selected from the group consisting of ethylene oxide, butadiene and mixtures thereof Applicants disclose the process according to Paragraphs 0019 to 0021 wherein said initiator is selected from the group consisting of primary alkyllithiums, secondary alkyllithiums, tertiary alkyllithiums, aryllithiums, and mixtures thereof; preferably said initiator is selected from the group consisting of primary alkyllithiums, secondary alkyllithiums and mixtures thereof. Primary and secondary alkyllithiums are the preferred initiating species due to their balance of effectiveness, stability and safety.

Applicants disclose the process according to Paragraph 0022, wherein:

a) said primary alkyllithium is selected from the group consisting of n-butyllithium, methyllithium, isobutyllithium, 3-trialkylsilyloxy-1-propyllithium and mixtures thereof;

b) said secondary alkyllithium is selected from the group consisting of isoproyllithium, sec-butyllithium and mixtures thereof, c) said tertiary alkylithium comprise tert-butyllithium, preferably said tertiary alkylithium is tert-butyllithium; and d) said aryllithium comprises phenyllithium, preferably said aryllithium is phenyllithium.

Applicants disclose the process according to Paragraphs 0019 to 0023 comprising, prior to the addition of said second fluid to said linear polymer:

a) combining said linear polymer with one or more additional liquids in an additional microfluidic reactor, said one or more additional fluids comprising a material selected from the group consisting of vinyls, conjugated dienes, ethylene oxide and mixtures thereof with the proviso that said ethylene oxide is a superheated fluid, preferably said one or more additional liquids comprise styrene and/or ethylene oxide; at a controlled rate, said rate having a variability of no greater than 1% of said one or more additional liquid's introduction rate into a microfluidic reactor; and b) reacting, at one or more temperatures, said linear polymer and said one or more additional liquids to form a new linear polymer, said one or more temperatures being controlled such that each temperature has a variability of about plus or minus 10 degrees, preferably said one or more temperatures being controlled such that each temperature has a variability of about plus or minus five degrees, more preferably said one or more temperatures being controlled such that each temperature has a variability of about plus or minus 1 degree;

preferably said linear polymer and said one or more additional liquids are simultaneously combined at a temperature of from about 0° C. to about 100° C., said linear polymer and said one or more additional liquids having residence time of from about 10 seconds to about 3600 seconds, more preferably said linear polymer and said one or more additional liquids are simultaneously combined at a temperature of from about 0° C. to about 80° C., said linear polymer and said one or more additional liquids having residence time of from about 30 seconds to about 1800 seconds, most preferably said linear polymer and said one or more additional liquids are simultaneously combined at a temperature of from about 25° C. to about 80° C., said linear polymer and said one or more additional liquids having residence time of from about 60 seconds to about 600 seconds.

Applicants disclose the process of Paragraph 0024, said process comprising repeating the process of Paragraph 0024 one or more times, in one aspect said process is repeated two to seven times. Each time said process is repeated, said process may be repeated with the same or different one or more additional liquids.

Applicants disclose the process according to Paragraphs 0024 to 0025, wherein said one or more additional liquids are selected from the group consisting of styrene, conjugated dienes, ethylene oxide and mixtures thereof, preferably said conjugated diene is selected from the group consisting of butadiene, isoprene, chloroprene and mixtures thereof; more preferably said conjugated diene is selected from the group consisting of isoprene, butadiene and mixtures thereof, more preferably said conjugated diene comprises butadiene; most preferably said conjugated diene is butadiene.

Applicants disclose the process according to Paragraph 0024, wherein said one or more additional liquids are obtained by condensing a gas, said one or more additional liquids comprising a material selected from the group consisting of ethylene oxide, isoprene, butadiene and mixtures thereof, preferably said one or more additional liquids comprises a material selected from the group consisting of ethylene oxide, butadiene and mixtures thereof Applicants disclose the process according to Paragraphs 0024 to 0027, wherein said one or more additional liquids comprises at least one conjugated diene that is a superheated fluid.

Applicants disclose the process according to Paragraphs 0019 to 0028 wherein said second liquid comprises at least one of propanol, butanol, pentanol, hexanol isomers of propanol, isomers of butanol, isomers of pentanol, and isomers of hexanol; preferably said second liquid comprises at least one of propanol and isopropanol most preferably said second liquid comprises:
  a) a mixture of isopropanol, hexane and/or an isomer of hexane
  b) a mixture of isopropanol and benzene; or
  c) a mixture of isopropanol and toluene.

Applicants disclose the process of Paragraphs 0019 to 0029 comprising, after said second liquid is added to said linear polymer, removing said second liquid from said linear polymer protic species solution, preferably about 95% to 100% of said second liquid is removed from said linear polymer protic species solution, preferably said second liquid is removed by evaporation, filtration and/or gravity assisted separation.

Applicants disclose a process of making an aerospace vehicle or consumer product comprising incorporating the linear polymer made according to Paragraphs 0019 to 0030 into an aerospace vehicle and/or consumer product.

Applicants disclose a process according to Paragraph 0031, wherein said linear polymer is incorporated into a structural component of said aerospace vehicle and/or consumer product.

A non-limiting schematic of one embodiment of a microfluidic flow apparatus to carry out the processes disclosed herein is depicted in FIG. 1. The microfluidic flow apparatus consists of low pulse continuous pumps (3) and (4) with inlets connected to sources of pumping fluid (1) and (2) and outlets connected by three way valves (5) and (6) to pressurized delivery apparatuses (7) and (8) which are then connected by three way valves (9) and (10) to a microfluidic flow cell (11). The outlet of the microfluidic cell is connected through a check valve (12) to a T-junction or microfluidic reactor (16), where it is combined with of quenching solution (13), delivered by a third low pulse continuous pump (14) through a check valve (15). The system pressure is constrained by a backpressure regulator (17) set at 100 psi, and the final quenched product is collected in a sample collection vessel (18). All connections are made using 1/16" O.D. ETFE tubing. The reagent reservoirs are constructed with 1/8" O.D. ETFE tubing.

Figure 2:
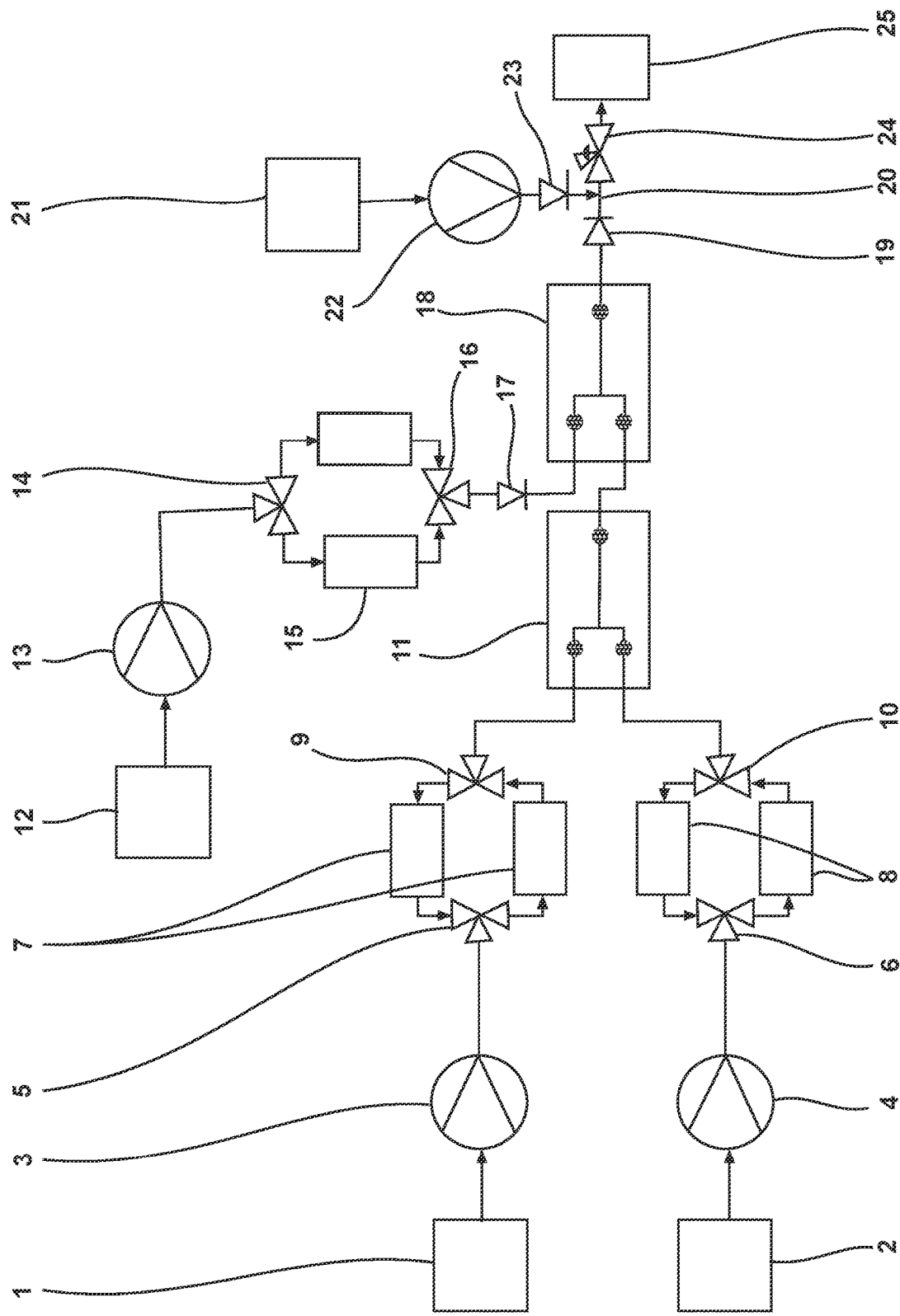
FIG. 2 is a schematic displaying a flow reactor system that employs a series of chip style reactors to achieve block copolymerization, with a continuous flow pump driving superheated reagent delivery.

A non-limiting schematic of one embodiment of a microfluidic flow apparatus to carry out the processes disclosed herein is depicted in FIG. 2. The microfluidic flow apparatus consists of low pulse continuous pumps (3) and (4) with inlets connected to sources of pumping fluid (1) and (2) and outlets connected by three way valves (5) and (6) to pressurized delivery apparatuses (7) and (8) which simultaneously deliver superheated reagent through way valves (9) and (10) to a first microfluidic flow cell (11). The outlet of the microfluidic cell (11) is connected to a second microfluidic flow cell (18), where it is simultaneously combined with reagent from a third pressurized delivery apparatus (15), which is connected to the microfluidic cell through a three way valve (16) connected to a check valve (17). Flow from this third reagent delivery apparatus (15) is driven through a three way valve (14) by a low pulse continuous pump (13), which is fed by a source of pumping fluid (12). The outlet of the second microfluidic cell (18) is simultaneously connected through a check valve (19) to a T-junction (20), where it is simultaneously combined with a quenching solution (21), delivered by a third low pulse continuous pump (22) through a check valve (23). The system pressure is constrained by a backpressure regulator (24) set at 100 psi, and the final quenched product is collected in a sample collection vessel (25). All connections are made using 1/16" O.D. ETFE tubing. The reagent reservoirs are constructed with 1/8" O.D. ETFE tubing.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. The microfluidic flow apparatus consists of a microfluidic reactor M1, a mixing tee T1, three low pulse continuous pumps P1, P2 and P3, and two pressurizable reagent delivery apparatuses R1 and R2 all connected as shown in FIG. 1. All connections are made using 1/16" O.D. ETFE tubing. Solution A consists of neat dry butadiene. Butadiene is a monomer which can be polymerized by anionic polymerization and has a subambient boiling point. Monomers which are polymerizable by anionic polymerization can be utilized. Solution B consists of 1.6 M n-butyllithium in hexanes. Solution C consists of dried and degassed hexanes. Solution D consists of deionized water. Solution E consists of 10% weight isopropanol in hexanes. Low pulse continuous pumps P1 and P2 are primed with solution D, and low pulse continuous pump P3 is primed with solution E. 20 mL of the cooled Solution A is added to the isolated and evacuated reagent delivery apparatus R1, taking care to avoid introduction of water or oxygen. 2.5 mL of Solution B is added to the isolated and evacuated reagent delivery apparatus R2, taking care to avoid introduction of water or oxygen. The microreactor M1, mixing tee T1 and adjacent connections are pressurized and purged with excess solution C to remove any voids. The microreactor M1 is connected to a recirculating chiller set at 80° C. and Pump P3 delivers solution C into mixing tee T1 at a flow rate of 600 µL/min for 10 minutes in order to achieve steady state pressure and temperature. After the reactor has reached operating temperature, solutions A and solution B are pumped at 530 and 70 µL/min respectively, giving a reactor residence time of 300 seconds. Once solution A enters the reactor, it is a superheated liquid. Reaction product was collected and washed with water, dried over of $MgSO_4$ with stirring, and concentrated by rotary evaporation at room temperature and a pressure of 10 millitorr.

Example 2. The microfluidic flow apparatus consists of two microfluidic reactors M1 and M2 with internal mixing volume of 3 mL each, a mixing tee T1, four continuous low pulse pumps P1, P2, P3 and P4, and three pressurizable in-line reagent containment apparatuses, R1, R2 and R3, all connected as shown in FIG. 2. All connections are made using 1/16" O.D. ETFE tubing. Solution A consists of dried butadiene. Butadiene is a monomer which can be polymerized by anionic polymerization and has a subambient boiling point. Monomers which are polymerizable by anionic polymerization can be utilized. Solution B consists of 1.6 M n-butyllithium in hexanes. Solution C consists of dried, degassed styrene. Solution D consists of dried and degassed hexanes. Solution E consists of deionized water. Solution F consists of 10% weight isopropanol in hexanes. Low pulse continuous pumps P1, P2 and P3 are primed with solution E, and low pulse pump P4 is primed with Solution F. 20 mL of cooled Solution A is added to the isolated and evacuated reagent delivery apparatus R1, taking care to avoid introduction of water or oxygen. 2.5 mL of Solution B is added to the isolated and evacuated reagent delivery apparatus R2, taking care to avoid introduction of water or oxygen. 20 mL of Solution C is added to the isolated and evacuated reagent delivery apparatus R1, taking care to avoid introduction of water or oxygen. The microreactors M1 and M2 and mixing tee T1 and adjacent connections are pressurized and purged with excess solution C to remove any voids. Microreactor M1 is connected to a recirculating chiller set at 80° C. Microreactor M2 is connected to a recirculating chiller set at 50° C. Pump P4 delivers solution C into the mixing tee T1 at a flow rate of 600 µL/min for 10 minutes in order to achieve steady state pressure and temperature. After the reactor has reached operating temperature, solutions A and B are pumped into microreactor M1 530 and 70 µL/min respectively, and solution C is pumped into microreactor M2 at 380 µL/min, giving a reactor residence time of 300 seconds. Once Solution A enters microreactor M1, it is a superheated liquid. Reaction product was collected and washed with water, dried over of $MgSO_4$ with stirring, and concentrated by rotary evaporation at room temperature and a pressure of 10 millitorr.

Example 3. Same as Example 1 except the monomer used is isoprene.

Example 4. Same as Example 1 except the monomer used is ethylene oxide.

Example 5. Same as Example 1 except solution A consisted of a 6.0 M solution of Butadiene in hexanes.

Example 6. Same as Example 1 except solution B consisted of a 1.6 M solution of sec-butyllithium in hexanes.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A process said process comprising:
   a) introducing a superheated fluid comprising a material selected from the group consisting of chloroprene, butadiene, isoprene and mixtures thereof, at a controlled rate, said rate having a variability of no greater than 1% of said superheated fluid's introduction rate into a microfluidic reactor; said superheated fluid being introduced by continuous piston pumps that propel a pumping fluid which in turn propels the superheated fluid into said microfluidic reactor;
   b) introducing an initiator at a controlled rate, said rate having a variability of no greater than 1% of said initiator's introduction rate into said microfluidic reactor; and
   c) reacting, at one or more temperatures, said superheated fluid and initiator to form a linear polymer, said one or more temperatures being controlled such that each temperature has a variability of about plus or minus five degrees and said superheated fluid and said initiator are simultaneously introduced at a temperature of from about 0° C. to about 100° C., said superheated fluid and said initiator having residence time of from about 10 seconds to about 3600 seconds;
   d) combining said linear polymer with one or more additional liquids in an additional microfluidic reactor, said one or more additional fluids comprising a material selected from the group consisting of vinyls, conjugated dienes, ethylene oxide and mixtures thereof with the proviso that said ethylene oxide is a superheated fluid; at a controlled rate, said rate having a variability of no greater than 1% of said one or more additional liquid's introduction rate into a microfluidic reactor;
   e) reacting, at one or more temperatures, said linear polymer and said one or more additional liquids to form a new linear polymer, said one or more temperatures being controlled such that each temperature has a variability of about plus or minus 10 degrees; and
   f) adding a liquid comprising a protic species to said new linear polymer to form a solution comprising said new linear polymer and said protic species.

2. The process of claim 1, wherein said one or more temperatures are controlled such that each temperature has a variability of about plus or minus 1 degree and said superheated fluid and said initiator are simultaneously introduced at a temperature of from about 0° C. to about 100° C., said superheated fluid and said initiator having residence time of from about 30 seconds to about 1800 seconds and said pumping fluid is hexane.

3. The process of claim 2, wherein said superheated fluid and said initiator are simultaneously introduced at a temperature of from about 40° C. to about 80° C., said superheated fluid and said initiator having residence time of from about 60 seconds to about 600 seconds.

4. The process according to claim 1, wherein said superheated liquid is obtained by condensing a gas, said gas comprising a material selected from the group consisting of butadiene, isoprene and mixtures thereof.

5. The process of claim 1, wherein said initiator is selected from the group consisting of primary alkyllithiums, secondary alkyllithiums, tertiary alkyllithiums, aryllithiums, and mixtures thereof.

6. The process according to claim 5, wherein:
a) said primary alkyllithium is selected from the group consisting of n-butyllithium, methyllithium, isobutyllithium, 3-trialkylsilyloxy-1-propyllithium and mixtures thereof;
b) said secondary alkylithium is selected from the group consisting of isoproyllithium, sec-butyllithium and mixtures thereof;
c) said tertiary alkylithium comprise tert-butyllithium; and
d) said aryllithium comprises phenyllithium.

7. The process of claim 1, wherein said one or more temperatures are controlled such that each temperature has a variability of about plus or minus 1 degree and said superheated fluid and said initiator are simultaneously introduced at a temperature of from about 0° C. to about 100° C., said superheated fluid and said initiator having residence time of from about 30 seconds to about 1800 seconds.

8. The process of claim 7, wherein said superheated fluid and said initiator are simultaneously introduced at a temperature of from about 40° C. to about 80° C., said superheated fluid and said initiator having residence time of from about 60 seconds to about 600 seconds.

9. The process of claim 1, said process comprising repeating the process of claim 1 one or more times.

10. The process according to claim 1, wherein said one or more additional liquids are selected from the group consisting of styrene, conjugated dienes, and mixtures thereof.

11. The process according to claim 1, wherein said one or more additional liquids are obtained by condensing a gas, said one or more additional liquids comprising a material selected from the group consisting of isoprene, butadiene and mixtures thereof.

12. The process according to claim 1, wherein said one or more additional liquids comprises at least one conjugated diene that is a superheated fluid.

13. The process according to claim 1, wherein said liquid comprising a protic species comprises at least one of propanol, butanol, pentanol, hexanol, isomers of propanol, isomers of butanol, isomers of pentanol, and isomers of hexanol.

14. The process of claim 1, comprising, after said liquid comprising a protic species is added to said new linear polymer, removing said liquid comprising a protic species from said solution comprising said new linear polymer and said protic species.

15. The process of claim 14, wherein about 95% to 100% of said liquid comprising a protic species is removed from said solution comprising said new linear polymer and said protic species.

* * * * *